US011138100B2

(12) United States Patent
Weiss et al.

(10) Patent No.: US 11,138,100 B2
(45) Date of Patent: Oct. 5, 2021

(54) SCENARIO BASED METHOD FOR TESTING SOFTWARE

(71) Applicant: B. G. NEGEV TECHNOLOGIES AND APPLICATIONS LTD., AT BEN-GURION UNIVERSITY, Beer Sheva (IL)

(72) Inventors: Gera Weiss, Lehavim (IL); Aviran Sadon, Haifa (IL); Achiya Elyasaf, Beer-Sheva (IL); Michael Bar-Sinai, Tel-Aviv (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 291 days.

(21) Appl. No.: 16/798,507

(22) Filed: Feb. 24, 2020

(65) Prior Publication Data
US 2020/0278922 A1 Sep. 3, 2020

Related U.S. Application Data

(60) Provisional application No. 62/809,769, filed on Feb. 25, 2019.

(51) Int. Cl.
*G06F 11/36* (2006.01)
(52) U.S. Cl.
CPC ...... *G06F 11/3696* (2013.01); *G06F 11/3664* (2013.01); *G06F 11/3688* (2013.01)
(58) Field of Classification Search
USPC ....................................................... 717/124
See application file for complete search history.

(56) References Cited

U.S. PATENT DOCUMENTS

| 7,228,524 B2 * | 6/2007 | Bailey | G06F 11/3696 714/38.1 |
| 8,250,538 B2 * | 8/2012 | Kashyap | G06F 8/20 717/124 |

(Continued)

OTHER PUBLICATIONS

Bar-Sinai et al., "BPjs—a framework for modeling reactive systems using a scripting language and BP," ACM, 2018, 11pg. (Year: 2018).*

(Continued)

*Primary Examiner* — Ryan D. Coyer
(74) *Attorney, Agent, or Firm* — Roach Brown McCarthy & Gruber, P.C.; Kevin D. McCarthy

(57) ABSTRACT

A method for testing operating software of a system consisting of a plurality of internal subsystems operating in an environment and controlled by a hardware board using electronic signals and an operating software. The signals are translated into a computer readable format by an interfacing card for each internal subsystem and simulating the internal subsystems by data acquisition modules by a simulating computer, which simulates the environmental conditions to which each module is currently exposed. A scenario based test software module generates a plurality of possible independent test scenarios using Behavioral Programming (BP) and the independent scenarios are interleaved at run time by an execution engine, to thereby automatically create a larger number of dependent and derived scenarios representing only possible combinations which are relevant to the operating conditions and states of the system.

10 Claims, 5 Drawing Sheets

(56) References Cited

U.S. PATENT DOCUMENTS

2008/0282231 A1* 11/2008 R ........................ G06F 11/3684
717/127
2011/0225568 A1* 9/2011 Rajan .................. G06F 11/3608
717/126

OTHER PUBLICATIONS

Gonzalez et al., "An Architecture-Tracking Approach to Evaluate a Modular and Extensible Flight Software for CubeSat Nanosatellites," IEEE, 2019, 21pg. (Year: 2019).*

Damm, W. and Harel, D., "LSCs: Breathing life into message sequence charts," Form. Methods Syst. Des., vol. 19, No. 1, 2001, pp. 45-80, doi:10.1023/A: 1011227529550 (36 pages).

Harel, D. and Marelly, R., Come, Let's Play: Scenario-Based Programming Using LSCs and the Play-Engine, Springer Science & Business Media, 2003. (397 pages).

Harel, D., Marron, A., and Weiss, G., "Behavioral Programming," Communications of the ACM, vol. 55, No. 7. 2012 (11 pages).

Harel, D., Marron, A., and Weiss, G., "Programming coordinated behavior in Java," in D'Hondt, T., ed., "ECOOP—Object-Oriented Programming," Springer Berlin Heidelberg, 2010 (25 pages).

Shimony, B. and Nikolaidis, I., "On coordination tools in the PicOS tuples system," in "ICSE,", 2011, pp. 19-24. (6 pages).

Wiener, G., Weiss, G., and Marron, A., "Coordinating and Visualizing Independent Behaviors in Erlang," in "Proceeding 9th ACM SIGPLAN Work. Erlang," ACM, 2010, pp. 13-22. (9 pages).

Bar-Sinai, M., Weiss, G., and Shmuel, R., "BPjs: An Extensible, Open Infrastructure for Behavioral Programming Research," in "Proceedings of the 21st ACM/IEEE International Conference on Model Driven Engineering Languages and Systems: Companion Proceedings," ACM, New York, N.Y., USA, Models '18, 2018, pp. 59-60, doi:10.1145/3270112.3270126. (2 pages).

Marron, A., Weiss, G., and Wiener, G., "A decentralized approach for programming interactive applications with javascript and blockly," in "Proceedings of the 2nd edition on Programming systems, languages and applications based on actors, agents, and decentralized control abstractions," ACM, 2012, pp. 59-70. (13 pages).

Kugler, H., Plock, C., and Roberts, A., "Synthesizing biological theories," in "CAV,", 2011, pp. 579-584. (6 pages).

Maoz, S., "Polymorphic scenario-based specification models: Semantics and applications," in "International Conference on Model Driven Engineering Languages and Systems," Springer, 2009, pp. 499-513 (15 pages).

Greenyer, J., Gritzner, D., Gutjahr, T., Konig, F., Glade, N., Marron, A., and Katz, G., "ScenarioTools—A tool suite for the scenario-based modeling and analysis of reactive systems," Science of Computer Programming, vol. 149, 2017, pp. 15-27 (13 pages).

Harel, D., Kugler, H., Marelly, R., and Pnueli, A., "Smart play-out of behavioral requirements," in "FMCAD," Springer, vol. 2, 2002, pp. 378-398 (18 pages).

Harel, D., Lampert, R., Marron, A., and Weiss, G., "Model-checking Behavioral Programs," in "Proceedings of the Ninth ACM International Conference on Embedded Software," ACM, New York, N.Y., USA, EMSOFT '11, 2011, pp. 279-288, doi:10.1145/2038642.2038686 (10 pages).

Harel, D., Kantor, A., Katz, G., Marron, A., Mizrahi, L., and Weiss, G., "On composing and proving the correctness of reactive behavior," in "EMSOFT,", 2013, pp. 1-10 (10 pages).

Maoz, S. and Sa'ar, Y., "Counter play-out: executing unrealizable scenario-based specifications," in "ICSE,", 2013, pp. 242-251 (10 pages).

Katz, G., "On module-based abstraction and repair of behavioral programs," in "Log. Program. Artif. Intell. Reason.", ACM, pp. 518-535, 2013 (18 pages).

Harel, D., Katz, G., Marron, A., and Weiss, G., "Non-intrusive Repair of Safety and Liveness Violations in Reactive Programs," Transactions on Computational Collective Intelligence XVI, pp. 1-33 (2014) (34 pages).

Harel, D., Kantor, A., and Katz, G., "Relaxing Synchronization Constraints in Behavioral Programs," in "Logic for Programming Artificial Intelligence and Reasoning,", 2013, pp. 355-372 (17 pages).

Ran, D., Sheng, T., Cao, L., Chen, X., and Zhao, Y., "Attitude control system design and on-orbit performance analysis of nano-satelliteTian Tuo 1," Chinese Journal of Aeronautics, vol. 27, No. 3, 2014, pp. 593-601 (9 pages).

Deng, S., Meng, T., Wang, H., Du, C., and Jin, Z., "Flexible attitude control design and on-orbit performance of the ZDPS-2 satellite," Acta Astronautica, vol. 130, 2017, pp. 147-161 (15 pages).

Michael Bar-Sinai; Achiya Elyasafy, Aviran Sadonz, Gera Weiss; A Scenario Based On-board Software and Testing Environment for Satellites. 59 IACAS, 2019 https://github.com/bThink-BGU/59IACAS-Appendix.(13 pages).

* cited by examiner

SCENARIO BASED METHOD FOR TESTING SOFTWARE

FIELD OF THE INVENTION

The present invention relates to the field of software testing. More particularly, the present invention relates to a method for testing software (such as satellites-software) using scenario-based programming.

BACKGROUND OF THE INVENTION

The most common way for increasing the efficiency and productivity of satellites and other space missions is to make them more autonomic: having better on-board control and troubleshooting capabilities. As a result, these machines are expected to become more software intensive. Since the 1990s, NASA and other authorities have begun examining artificial intelligence approaches and algorithms for ground control systems and space crafts. The goal of these examinations was to automate some aspects of space missions in order to reduce the number of experts required to control and coordinate the missions. This was followed by a research of agent-based methods and control theory concepts, directed towards improving future self-management and survivability in the harsh environments in which space missions operate.

While software-based systems that make complex decisions are common in other fields, bringing advanced features to space is a challenge, as systems must maintain extremely high reliability standards. In a sense, software engineering is moving in a direction opposite to the culture used in space-mission software development. While software development techniques such as agile programming, adaptive planning, evolutionary development, early delivery, and continuous integration have many benefits, they cannot be directly implemented in the context of space mission software development because of the strict safety and robustness requirements expected from satellite software.

Such robustness requirements are needed, since failures in satellite software may cause the loss or crash of a satellite, which entails the loss of huge budgets spent during building and launching satellites. This leads to the need for very intense and strict testing of the satellite software. However, such testing is very expensive and even after performing it using conventional testing schemes, still that may be possible scenarios which are left untested (as it is impossible to cover each and every possible scenarios and extreme conditions).

Even though conventional methods may theoretically use combinations of many predetermined fixed scenarios, most of these combinations are irrelevant to the normal functioning of a tested system. Therefore, testing is performed only for predetermined and limited set of scenarios which developers may think of, while failing to consider other tests which may be crucial to the appropriate functioning of a satellite.

It is therefore an object of the present invention to provide a method for performing strict software testing that automatically considers a large number of possible scenarios.

It is another object of the present invention to provide method for performing strict software testing that considers only scenarios that are relevant to the system requirements.

Other objects and advantages of the invention will become apparent as the description proceeds.

SUMMARY OF THE INVENTION

A method for testing operating software of a system consisting of a plurality of internal subsystems operating in an environment, comprising the steps of:
 a) providing a hardware board that controls the system by an operating software and the internal subsystems by electronic signals;
 b) translating the signals into a computer readable format by an interfacing card for each internal subsystem;
 c) simulating the internal subsystems by data acquisition modules by a simulating computer;
 d) simulating, by the simulating computer, the environmental conditions to which each module is currently exposed;
 e) generating, by a scenario based test software module, a plurality of possible independent test scenarios using Behavioral Programming (BP); and
 f) interleaving the independent scenarios at run time by an execution engine, to thereby automatically create a larger number of dependent and derived scenarios representing only possible combinations which are relevant to the operating conditions and states of the system.

A test setup for testing operating software of a system consisting of a plurality of internal subsystems operating in an environment, which comprises:
 a) a hardware board that controls the system by an operating software and the internal subsystems by electronic signals;
 b) an interfacing card for each internal subsystem for translating the signals into a computer readable format;
 c) a simulating computer, adapted to:
  c.1) simulate the internal subsystems by data acquisition modules;
  c.2) simulate the environmental conditions to which each module is currently exposed;
  c.3) generate, by a scenario based test software module, a plurality of possible independent test scenarios using Behavioral Programming (BP); and
  c.4) interleave the independent scenarios at run time by an execution engine, to automatically create a larger number of dependent and derived scenarios representing only possible combinations which are relevant to the operating conditions and states of the system.

Possible combinations which are relevant to the operating conditions and states of the system may be selected by rules which determine at any given moment, combinations of scenarios that that can happen and combinations of scenarios that cannot happen, according to the system requirements.

Environmental conditions to which each module is currently exposed may be simulated using Systems Tool Kit (STK) and MATLAB, for running an environment model.

Independent scenarios may be created by atomic behaviors that may, must, or must not happen, where each behavior is a b-thread being a sequential thread of execution.

In one aspect, the system is a satellite and the operating software is a satellite software.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1A:
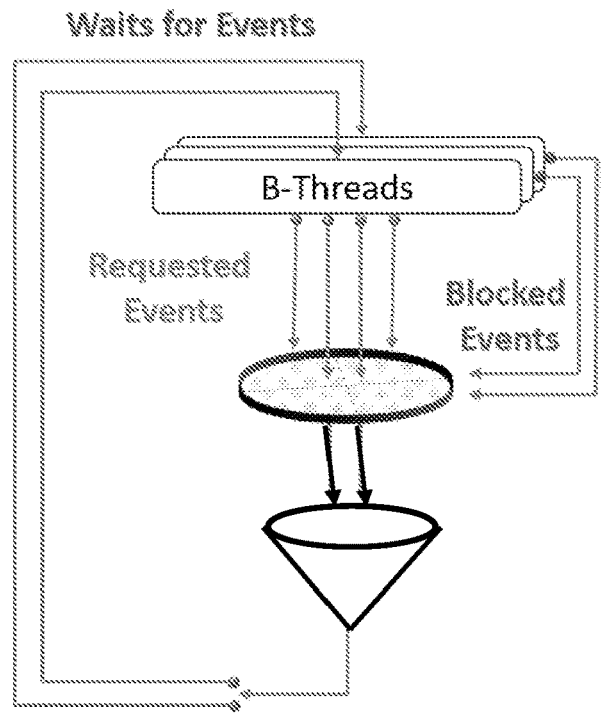
FIG. 1A illustrates how a b-program makes decisions and eliminates irrelevant or illegitimate events.

The present invention provides a system and method for satellites-software testing, that allow fast and rich formal verification for safer and more robust satellite software. The method proposes to use scenario-based programming where software components (modules) represent different aspects of mission, relevant scenarios and anti-scenarios (scenarios that must not happen). Examples of how specifications for flight management can be translated into code artifacts that represent them in a direct and intuitive way are described below.

The software test environment includes an automatic model-checking tool for verifying the produced software and for bug detection. Unlike conventional software testing, this automatic model-checking tool allows exhaustive analysis of the code that produces formal guarantees of quality. Verification can be done on specific parts of the model, on specific logical layers of the applications, and on the entire model at a specific abstraction level. This allows modular design process, where modules, layers, and aspects of the behavior can be tested and verified in isolation as soon as their code is ready. Additionally, a "hybrid laboratory" is described for advanced testing of the mission software. In addition to standard components the hybrid laboratory uses a novel approach that allows the automatic generation of combination of test scenarios, using scenario-based programming.

Scenario-Based Programming (SBP) [1,2] is a paradigm for creating executable models for reactive systems that are comprised of independent software modules, or scenarios. Each scenario describes a different aspect of the overall desired and undesired system behaviors, and the scenarios are interleaved at run time by an execution engine. The paradigm was introduced through the language of live sequence charts (LSC) and its Play-Engine implementation [1, 2]. The method has been generalized to the Behavioral Programming (BP) paradigm [3], and has been extended to other languages and tools, including Java [4], C [5], Erlang [6], JavaScript [7], Blockly [8], SBT [9], Polymorphic Scenarios [10], and Scenario Tools [11]. Research results cover, among others, run-time look ahead (smart playout) [12], synthesis [9], model-checking [13], compositional verification [14], analysis of unrealizable specification [15], abstraction-refinement mechanism [16], automatic correction tools [17], and synchronization relaxation tools [18].

Behavioral Programming

The Behavioral Programming (BP) [3] paradigm focuses on modular behaviors: how a system behaves within its environment, and how it behaves internally. When creating a system using BP, developers specify many atomic behaviors that may, must, or must not happen. Each behavior is a simple sequential thread of execution, and is thus called a b-thread. b-threads are normally aligned with system requirements, such as "send telemetry when over a ground station" or "don't use the camera while battery is low."

A behavioral program (b-program) consists of multiple b-threads. During runtime, all b-threads participating in a b-program are combined, yielding a complex behavior that is consistent with all said b-threads. Unlike other paradigms, BP does not force the developers to pick a single behavior for the system to be used. Instead, the system is allowed to choose any compliant behaviors. This allows the runtime to optimize program execution at any given moment, e.g., based on available resources. The fact that all possible system behaviors comply with the b-threads (and thus with system requirements), ensures that whichever behavior is chosen, the system as a whole will perform as specified.

B-Threads are combined using a simple protocol, based on events and synchronization points. When a b-thread reaches a point where it needs to synchronize with its peers—for example, in order to use a shared resource—it submits a synchronization statement to the b-program it participates in. This statement details which events said b-thread requests, which events it waits for (but does not request), and which events it blocks (eliminates from happening). After submitting the statement, the b-thread is paused. When all b-threads have submitted their statements, the b-program has reached a synchronization point. Then, a central event arbiter selects a single event that was requested, and was not blocked. Having selected an event, the arbiter resumes all b threads that requested or waited for that event. The rest of the b-threads remain paused, and their statements are used in the next synchronization point. This process is repeated throughout the execution of the program.

FIG. 1A illustrates how a b-program makes decisions through the following cycle: At step 1, all b-threads run until they are ready to specify events that they request, events that they block, and events that they are waiting for; At step 2, an event that is requested and not blocked is selected (randomly or by some predefined preference rule);

At step 3, the b-threads that are waiting for and the b-threads that requested the selected event run again until they are ready for a new request/wait-for/block specification and the cycle goes back to step 2.

BP works as a non-deterministic software, which does not force the developer to choose a single behavior, unlike other paradigms. All the b-threads that participate in a b-program are combined during run-time, using the simple cycle described above, based on events and synchronization points. Together, they create a complex joint behavior. A synchronization point is a b-program state in which all of the b-threads have submitted a synchronization statement to the b-program they participate in. This statement contains a specification of which events the b-thread requested, which events it waits for (but does not request), and which events it blocks (forbids from happening). In a synchronization point, the submitting b-threads is paused. Then, a single event that was requested but not blocked, is being selected by a central event arbiter. Once the event has been selected, the arbiter resumes all b-threads that requested or waited for that event. The rest of the b-threads remain paused, and their statements are used in the next synchronization point. Throughout the execution of the program, the process repeats itself. During the execution, the b-threads can terminate, create new b-threads, and perform assertions.

Example of Behavioral Programming

To make these concepts more concrete, a tutorial example of a simple b-program, written using BPjs, is presented. In this example, an adaptation of one of the first sample programs presented at [4] (the HOT/COLD example).

Figure 1B:
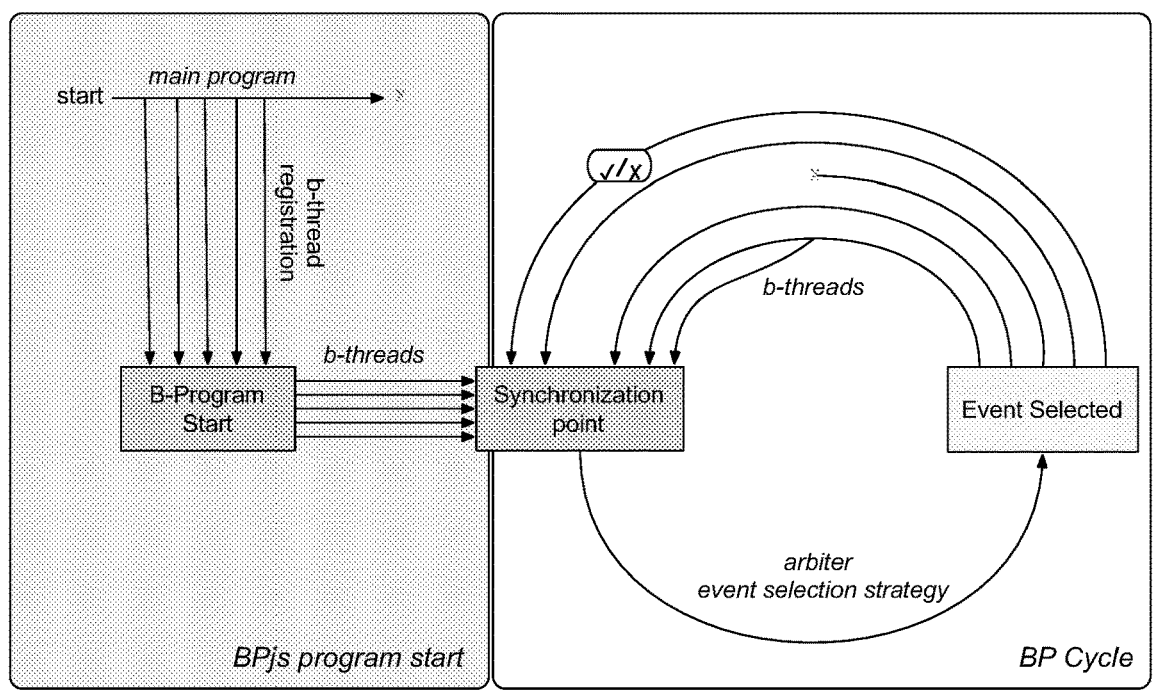
FIG. 1B shows a Life cycle of a b-program using BPjs.

FIG. 1B shows a life cycle of a b-program using Behavioral Programming java scripts (BPjs). BPjs is an approach and technique for software development, which enables incremental development in a natural way. A behavioral application consists of threads of behavior each of which represents an independent scenario that the system should and shouldn't follow. These independent behavior threads are interwoven at run-time, thereby yielding integrated system behavior. For example, in a game-playing application, each game rule, and each playing strategy are programmed separately and independently with little or no awareness of other modules.

The execution starts with a regular JavaScript program, which registers b-threads. Once the program terminates, all b-threads are started concurrently. B-threads repeatedly execute internal logic and then synchronize with each other, by submitting a synchronization statement to a central event arbiter. Once all b-threads have submitted their statements, the central event arbiter selects an event that was requested and was not blocked. B-threads that either requested or waited for this event are resumed, while the rest of the b-threads remain paused for the next cycle. During their execution phase, b-threads can terminate, register new b-threads, and perform assertions.

Example of a system with the following requirements:
1. When the system loads, do 'A' three times.
2. When the system loads, do 'B' three times.

Listing 1 shows a b-program (a set of b-threads) that fulfills these requirements. It consists of two b-threads, added at the program start-up. One b-thread, namely Do-A, is responsible for fulfilling requirement #1, and the second b-thread, namely Do-B, fulfills requirement #2.

Listing 1. A b-program that do 'A' and 'B' three times each. The order between 'A' and 'B' events is arbitrary.

```
1   bp.registerBThread("Do-A", function( ){
2       bp.sync({request: bp.event("A")});
3       bp.sync({request: bp.event("A")});
4       bp.sync({request: bp.event("A")});
5   });
6   bp.registerBThread("Do-B", function( ){
7       bp.sync({request: bp.event("B")});
8       bp.sync({request: bp.event("B")});
9       bp.sync({request: bp.event("B")});
10  });.
```

The structure of the program is aligned with the system's requirements. It has a single b-thread for each requirement, and it does not dictate the order in which actions are performed (e.g., the following runs are possible: AABBAB, or ABABAB, etc.). This is in contrast to, say, a single-threaded JavaScript program that would have to dictate exactly when each action should be performed. Thus, traditional programming paradigms are prone to over specification, while behavioral programming avoids it.

While a specific order of the actions was not required originally, in some cases, this behavior may represent a problem, i.e., there is an additional requirement that the user detected after running the initial version of the system:
3. Two actions of the same type cannot be executed consecutively.

While a condition may be added before requesting 'A' and 'B', the BP paradigm encourages to add a new b-thread for each new requirement. Thus, a b-thread called Interleave was added, presented in Listing 2.

Listing 2. A b-thread that ensures that two actions of the same type cannot be executed consecutively, by blocking and additional request of 'A' until the 'B' is performed, and vice-versa.

```
1   bp.registerBThread("interleave", function( ) {
2       while ( true ) {
3           bp.sync({waitFor: bp.event("B"), block: bp.event("A")});
4           bp.sync({waitFor: bp.event("A"), block: bp.event("A")});
5       }
6   });
```

The interleave b-thread ensures that are no repetitions by forcing an interleaved execution of the performed actions first 'A' is blocked until 'B' is executed; first 'B' is blocked until 'A' is executed. This is done by using the waitFor and block mechanisms. This b-thread can be added and removed without affecting other b-threads. This is an example of a purely additive change, where system behavior is altered to match a new requirement without affecting the existing behaviors.

Managing the EPS and the ADCS Sub-Systems Using BPjs

BPjs can be used for developing software that manages two satellite sub-systems. The first sub-system is EPS (Electric Power System). For this example, it is assumed that the EPS can switch between three operational modes: "good", "low", and "critical", which are functions of the battery voltage. The second subsystem is Attitude Determination and Control System (ADCS). It is assumed that it can switch between three attitude control modes: 1) detumbling: used for reducing angular rates, usually after deployment; 2) sun pointing: used for pointing the satellite's solar panels towards the sun in order to charge its batteries; and 3) payload pointing: used for pointing the satellite's payload to a desired set point. The ADCS is activated when a payload pass is scheduled. For this example, it is assumed that that both the EPS and ADCS have a dedicated hardware that takes care of "low-level requirements" (e.g., activation of actuators and sensors) and that the on-board software sends only "high-level commands" (e.g., switch to 'X' operational mode). Assuming this system architecture, the OBC has the all the cross-system knowledge, thus expected to make the cross-system decisions.

The on-board b-program software has a dedicated b-thread for each sub-system, implementing its logic. The logic takes inspiration from other real satellite mission, as [19, 20].

The EPS logic is specified by the b-thread presented in Listing 3. The system waits for an EPS telemetry event, containing current telemetry received from the EPS board. In this example, it is assumed that this includes the battery voltage and the current EPS mode. According to the battery voltage field in the EPS telemetry, an initial EPS mode is requested using the setEPSMode event. After this initialization is done, every time an EPS telemetry is received (i.e., an EPSTelemetry event is selected), this b-thread requests an EPS-mode change based on the current battery voltage.

The code in Listing 3 avoids stale requests that rely on old telemetries using a notable technique. Whenever it requests an EPS-mode change, it also waits for EPS-telemetry events. If a new telemetry arrives before the set-mode request has been granted (that is, an EPSTelemetry event was selected by the b-program before the requested setEPSMode event was), the set-mode request is cancelled and the b-thread has a chance to re-evaluate it.

```
Listing 3. EPS b-thread.
1    var EPSTelem = bp.EventSet("EPSTelem", function(e){
2        return e instanceof EPSTelementry;
3    }):
4
5    var LOW_MAX = 70;
6    var GOOD_MIN = 60;
7    var CRITICAL_MAX = 50;
8    var LOW_MIN = 40;
9
10   bp.registerBThread("EPS - Turn ON/OFF logic", function ( ) {
11
12       /* Init */
13       var ePSTelem = bp.sync({waitFor: EPSTelem});
14       if (ePSTelem.vBatt >= GOOD_MIN) {
15           bp.sync({waitFor: EPSTelem,
16                   request: StaticEvents.SetEPSModeGood});
17       } else if (ePSTelem.vBatt >= LOW_MIN) {
18           bp.sync({waitFor: EPSTelem,
19                   request: StaticEvents.SetEPSModeLow});
20       } else {
21           bp.sync({waitFor: EPSTelem,
22                   request: StaticEvents.SetEPSModeCritical});
33       }
24       delete ePSTelem;
25
26       // ongoing control loop
27       while (true) {
28           var ePSTelem = bp.sync({waitFor: EPSTelem});
29           switch ( ePSTelem.mode ) {
30               case EPSTelementry.EPSMode.Good:
31                   if (ePSTelem.vBatt < GOOD_MIN) {
32                       bp.sync({waitFor: EPSTelem,
33                               request: StaticEvents.SetEPSModeLow});
34                   }
35                   break;
36
37               case EPSTelementry.EPSMode.Low:
38                   if (ePSTelem.vBatt > LOW_MAX) {
39                       bp.sync({waitFor: EPSTelem,
40                               request: StaticEvnets.SetEPSModeGood});
41                   }
42                   if (ePSTelem.vBatt < LOW_MIN) {
43                       bp.sync({waitFor: EPSTelem,
44                               request: StaticEvents.SetEPSModeCritical});
45                   }
46                   break;
47
48               case EPSTelementry.EPSmode.Critical:
49                   if (ePSTelem.vBatt > CRITICAL_MAX) {
50                       bp.sync({request: StaticEvents.SetEPSModeLow});
51                   }
52                   break;
53           }
54       }
55   });
```

The ADCS logic is specified by the b-thread presented in Listing 4. It is initialized by requesting a SetADCSModeDetumbling event. Each time an ADCSTelemetry event is selected, the appropriate SetADCSMode event, based on the following: 1) the current ADCS mode; 2) the current angular rate; and 3) whether the satellite is during an active pass or not. This b-thread, too, avoids stale set requests by waiting for telemetry events while requesting ADCS changes.

Listing 4. ADCS b-thread.

```
1   var ACDSTelem = bp.EventSet("ADCSTelem", function (e) {
2       return e instanceof ADCSTelementry;
3   });
4
5   bp.registerBThread("ADCS Mode Switch logic", function ( ) {
6
7       /* Init Deployment*/
8       bp.sync({request: StaticEvents.SetADCSModeDetumbling});
9
10      /* ongoing */
11      while (true) {
12          var aDCSEvent = bp.sync({waitFor: ADCSTelem});
13
14          switch ( aDCSEvent.mode ) {
15              case ADCSTelementry/ADCSMode.Detumbling
16                  if (aDCSEvent.angularRate == "Low" && aDCSEvent.isActivePass) {
17                      bp.sync({waitFor: ADCSTelem,
18                          request: StaticEvents.SetADCSModePayloadPointing});
19                  } else if (aDCSEvent.angularRate == "Low") {
20                      bp.sync({waitFor: ADCSTelem,
21                          request: StaticEvents.SetADCSModeSunPointing});
22                  }
23                  break;
34              case ADCSTelementry.ADCSMode.SunPointing:
25                  if (aDCSEvent.angularRate == "Low" && aDCSEvent.isActivePass) {
26                      bp.sync({waitFor: ADCSTelem,
27                          request: StaticEvents.SetADCSModePayloadPointing});
28                  } else if (aDCSEvent.angularRate == "High") {
29                      bp.sync({waitFor: ADCSTelem,
30                          request: StaticEvents.SetADCSModeDetumbling});
31                  }
32                  break;
33              case ADCSTelementry.ADCSMode.PayloadPointing;
34                  if (aDCSEvent.angularRate == "Low" && !aDCSEvent.isActivePass) {
35                      bp.sync({waitFor: ADCSTelem,
36                          request: StaticEvents.SetADCSModeSunPointing});
37                  } else if (aDCSEvent.angularRate == "High") {
38                      bp.sync({waitFor: ADCSTelem,
39                          request: StaticEvents.SetADCSModeDetumbling});
40                  }
41                  break
42          }
43      }
44  });
```

A Cross-System Requirement

An additional logic is required for handling behaviors between different sub-systems, on top of the logic of each sub-system. An example of a cross-system requirement may be that the ADCS should not remain in, or switch to, payload-pointing mode while the EPS mode is low or critical. Whether this requirement was originally given, or after the first two were written and tested, the BP paradigm encourages adding a new b-thread for blocking this newly undesired behavior. The additional b-thread is given in Listing 5.

Listing 5. Integrator b-thread.

```
1   bp.registerBThread("EPS & ADCS Integrator", function ( ) {
2       while (true) {
3           var ePSTelem2 = bp.sync({waitFor: EPSTelem});
4           while ( ePSTelem2.currentEPSMode == "Low" ||
5                   ePSTelem2.currentEPSMode == "Critical" ) {
6               if ( ePSTelem2.isActivePass ) {
7                   bp.sync({waitFor: ADCSTelem,
8                       request: StaticEvents.PassDone,
9                       block: StaticEvents.SetADCSModePayloadPointing
10                  });
11              }
12              var aDCSEvent2 = bp.sync({waitFor: ADCSTelem,
13                      block: bp.Event("SetADCSModePayloadPointing")});
14              if (aDCSEvent2.currentADCSMode == "PayloadPointing")
15                  bp.sync({waitFor:ADCSTelem,
16                      request: StaticEvents.SetADCSModePayloadPointing
17                      block: bp.Event.SetADCSModePayloadPointing
18                  });
19          }
20          var ePSTelem2 = bp.sync({waitFor: EPSTelem,
```

| Listing 5. Integrator b-thread. |
| --- |

```
21                 block: StaticEvents.SetADCSModePayloadPointing
22          });
23        }
24     }
25  });
```

Formal Verification of B-Programs

The BPjs tool can be used to verify system correctness (i.e., that it behaves correctly). This verification can be performed on specific parts of a model, on specific logical layers of an application, or on an entire model at a specific abstraction level. This allows for a modular design process, where modules are tested and verified as soon as their code is ready.

A b-program is verified by looking at all of its possible runs, and ensuring they all comply with a set of formal requirements. This is a computationally-intensive process, and may also be infinite. To this end, BPjs enables model developers to limit the explored runs, for example by limiting the length of each explored run, or by including explicit assumptions, such as the keeping battery voltage in a limited range. Additional methods for reducing the computational load are described in [13,14.[

For example if it is required to verify that the ADCS does not switch to the payload-pointing mode while the EPS mode is low or critical, the bp.ASSERT( )method is used for marking such possibility as invalid. During the verification processes, the proposed method searches for possible runs that reach such states. The assertion is given in a new b-thread, presented in Listing 6.

During execution, a false assertion causes the b-program to terminate, and the host Java program is informed of the failure. From the b-program side, assertions are an "emergency shutdown" mechanism. From the host Java program side, false assertions allow restarting the b-program with different parameters, or with a modified set of b threads, in order to avoid the error because of which the false assertion was generated. One example for this is automated patching of b-programs [16, 17].

The main usage of assertions, though, is during verification process, where BPjs traverse the possible b-program runs, looking for invalid states. Once such state is found, BPjs returns the sequence of the events that led it to the discovered invalid state. This type of verification has an advantage over tests, since it can specify what went wrong, rather than "just" detecting when something is wrong.

Simulating the Environment for the Verification

The b-program is verified by looking at all of its possible runs. The verification is done on the b-program only, excluding the actual system interactions with the environment. Therefore, the environment events (e.g., the telemetry events) have to be simulated during the verification process.

The proposed method starts with a b-thread that randomly generates all of the possible environment events (shown in Listing 7). It requests EPSTelemetry and ADCSTelemetry events in order, but each event is arbitrarily chosen from all possible events of each type. For example, and EPSTelemtry event can be any of the 606 possible combinations of active pass (yes/no), battery level (0 to 100 inclusive) and EPS mode (good/low/critical).

| Listing 6. A safety requirement b-thread, generating a false assertion when the there is a request to switch to the payload-pointing mode while the EPS mode is low or critical. |
| --- |

```
1   bp.registerBThread("NeverPointingOnLow", function ( ) {
2        var relevantEvents = [ESPTelem, USE_PAYLOAD];
3        /* Init */
4        var canPoint;
5        var evt = bp.sync({waitFor: relevantEvents});
6        if (EPSTelem.contains(evt)) {
7            canPoint = evt.mode.equals(EPSTelementry.EPSMode.Good);
8        }
9
10       /* ongoing verification */
11       while (true) {
12            var pointingRequested = false;
13            var evt = bp.sync({waitFor: relevantEvents});
14            if (EPSTelem.contains(evt)) {
15                canPoint = evt.mode.equals(EPSTelementry.EPSMode.Good);
16            } else if (USE_PAYLOAD.equals(evt)) {
17                pointingRequired = true;
18            }
19
21            bp.ASSERT(!(pointingRequested && !canPoint));
22       }
23  });
```

Listing 7. A b-thread that randomly generates all of the possible EPSTelementary and ADCSTelementary event.

```
1   var ACTIVE_PASSES = [false,true];
2
3   // Generate all possible EP3 Telementries
4   var EPS_Modes = EPSTelementry.EPSMode.values ( ).
5   var possibleEPSes = [ ];
6   for ( var vBatt=0; vBatt <= 100; vBatt++ ) {
7       for ( var modeIdx in EPS_MODES ) {
8           for ( var activePassIdx in ACTIVE_PASSES ) {
9               possibleEPSes.push( EPSTelementry(vBatt.
10                  EPS_MODES[modeIdx].
11                  ACTIVE_PASSES[activePassIdx]
12          }
13      }
14  )
15
16  // Generate all possible ADCS Telementries
17  var ADCS_MODES = ADCSTelementry.ADCSMode.values( );
18  var ANGULAR_RATES = ADCSTelementry.AngularRate.values( );
19  var possibleADCSes = [ ];
20  for ( var adcsModeIdx in ADCS_MODES ) {
21      for ( var angularRateIDX in ANGULAR_RATES ) {
22          for ( var activePassIdx in ACTIVE_PASSES ) {
23              possibleADCSes.push( ADCSTelementry(ADCS_MODES[adcsModeIdx],
24                  ANGULAR_RATES[angluarRateIdx],
25                  ACTIVE_PASSES[activePassIdx]) );
26          }
27      }
28  }
29
30  bp.registerBThread("Environment", function( ){
31      while ( true ) {
32          bp.sync({request:possibleEPses}); // Chooses a random EPSTelemery event
33          bp.sync({request:possibleADCSes}); // Chooses a random ADCSTelemery event
34      }
35  });
```

These b-threads were used to verify the system. First, as a baseline, the cross-system b-thread (Listing 5) was removed, and the proposed method successfully verified that the proposed system indeed violates the cross-system requirement. Next, the proposed method tried to verify the system including, the cross system requirement. The verification process scanned approximately 650K possible states, using 1.3M iterations, without finding any violations. Since the events were chosen randomly, it is not promised that all possible runs will be covered.

A more realistic environment simulation generates the telemetry events according to previous selected events. For example, whenever a SetEPSModeGood event is selected, the following EPSTelemetry event will represent this mode switch. The complete code for this simulation can be found in [21]. The system has been verified using this environment two steps: the first without the cross-system b-thread, and the second with the cross-system b-thread. As before, the first run resulted with a trace of the events that led to the violation, presented in Listing 8. For all possible runs of up to 200 consecutive selected events, the second approach was able to verify that there are no violationsin less than 2.5 minutes. Runs of a greater depth (i.e., longer) are also possible to be verified using this approach.

Listing 8. A trace of the events that led to a violation of the system that does not include the the cross-system b-thread.

```
1   [BEvent name:SetADCSModeDetumbling]
2   [BEvent name:EnvSetAngularRateLow]
3   [BEvent name:PassDone]
4   [EPSTelementry vBatt:1 currentEPSMode:Good activePass:false]
5   [BEvent name:SetEPSModeCritical]
6   [ADCSTelementry currentADCSMode:Detumbling angularRate:Low activePass:false]
7   [BEvent name:SetADCSModeSunPointing]
8   [EPSTelementry vBatt:2 currentEPSMode:Critical activePass:false]
9   [ADCSTelementry currentADCSMode:SunPointing angularRate:Low activePass:false]
10  [EPSTelementry vBatt:3 currentEPSMode:Critical activePass:false]
11  [ADCSTelementry currentADCSMode:SunPointing angularRate:Low activePass:false]
12  [EPSTelementry vBatt:4 currentEPSMode:Critical activePass:false]
13  [ADCSTelementry currentADCSMode:SunPointing angularRate:Low activePass:false]
14  [EPSTelementry vBatt:5 currentEPSMode:Critical activePass:false]
15  [ADCSTelementry currentADCSMode:SunPointing angularRate:Low activePass:false]
16  [EPSTelementry vBatt:6 currentEPSMode:Critical activePass:false]
17  [ADCSTelementry currentADCSMode:SunPointing angularRate:Low activePass:false]
18  [EPSTelementry vBatt:7 currentEPSMode:Critical activePass:false]
19  [ADCSTelementry currentADCSMode:SunPointing angularRate:Low activePass:false]
20  [EPSTelementry vBatt:8 currentEPSMode:Critical activePass:false]
```

Listing 8. A trace of the events that led to a violation of the
system that does not include the the cross-system b-thread.

```
21  [ADCSTelementry currentADCSMode:SunPointing angularRate:Low activePass:false]
22  [EPSTelementry vBatt:9 currentEPSMode:Critical activePass:false]
23  [ADCSTelementry currentADCSMode:SunPointing angularRate:Low activePass:false]
24  [EPSTelementry vBatt:10 currentEPSMode:Critical activePass:false]
25  [ADCSTelementry currentADCSMode:SunPointing angularRate:Low activePass:false]
26  [BEvent name:ActivePass]
27  [ADCSTelementry vBatt:11 currentEPSMode:Critical activePass:true]
28  [EPSTelementry currentADCSMode:SunPointing angularRate:Low activePass:true]
29  [BEvent name:SetADCSModePayloadPointing]
```

Hybrid Lab Testing Environment

Figure 2:
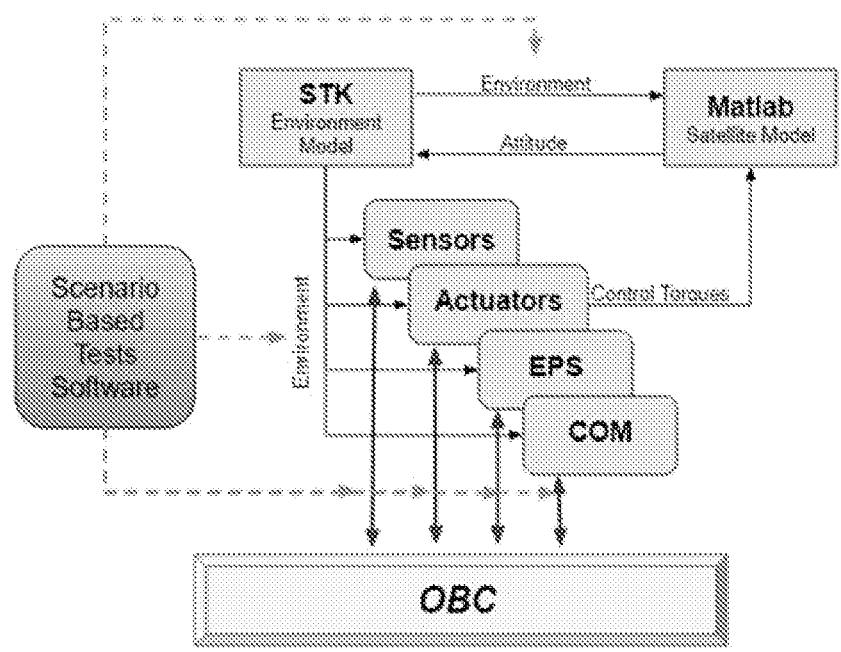
FIG. 2 illustrates a layout of a hybrid lab testing environment for advanced simulation and testing of software, where scenario-based programming is used to automatically generate complex test scenarios.

FIG. 2 illustrates a layout of a hybrid lab testing environment, which is used for advanced simulation and testing of satellite-mission software, where scenario-based programming is used to automatically generate complex test scenarios. This hybrid lab is used for integrating and testing full-scale satellite on-board software.

The hybrid lab consists of a simulation computer (a desktop PC), and an On-Board Computer (OBC), on which the on-board software runs. The simulation computer runs MATLAB, Systems Tool Kit (STK), and custom software for simulating satellite sensors (e.g., temperature, sun, magnetometers), actuators (e.g., magneto-torquers, wheels, heaters), and all the other satellite subsystems that the OBC interacts with (e.g., EPS, communications, and payload). MATLAB is used for evaluating and running the satellite's dynamics model. STK is used for evaluating and running the environment model (e.g., gravity and magnetic fields, and earth coverage).

The simulation computer interacts with the OBC using the native electrical on-board connectors used by the real hardware that the PC simulates. Thus, from the OBC's standpoint, the hybrid lab setup is identical to the setup used in orbit.

The hybrid lab allows developers to examine how the on-board software performs in various scenarios. Such scenarios may be hardware failures, specific orbits and environmental conditions, written as scenario-based test software. Additionally, the lab's layout makes it possible to gradually replace simulated devices with actual ones. In turn, this gradual replacement may be used to test the integration of hardware components with the simulator, the OBC, and the on-board software.

The simulation computer simulates the satellite's dynamics, environment, and various hardware components. The OBC and the simulation computer interact using the native electrical on-board connectors used by the real hardware that the PC simulates.

Figure 3:
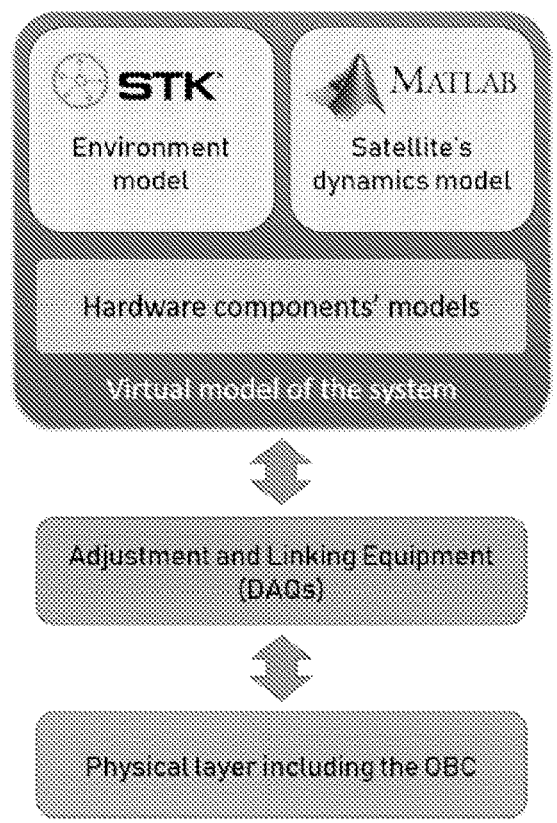
FIG. 3 illustrates an example a virtual system model, proposed by the present invention.

FIG. 3 illustrates an example a virtual system model, proposed by the present invention. The 'virtual model' is run on the simulation computer that simulates the environment of the satellite and its hardware subsystems. The proposed system model uses the Systems Tool Kit (STK) software (a physics-based software package from Analytical Graphics, Inc. that allows engineers and scientists to perform complex analyses of ground, sea, air, and space platforms, and share results in one integrated environment) which is a reliable tool for simulating the physics of a satellite, its orbit, and all the physical dynamics and data. The required data was stored, using Simulink (a MATLAB-based graphical programming environment for simulating and analyzing multidomain dynamical systems) in the satellite's dynamics model which was written in MATLAB. The hardware component's model was implemented with the BPjs platform in Java and JavaScript. Specifically, the four subsystems of the satellite were implemented in Java. They communicate with MATLAB via the TCP protocol. The logical part of each subsystem of the satellite was written in JavaScript according to the principles of the behavioral programming paradigm. Data Acquisition (DAQ) boards were used for linking the electric outputs and inputs of the On-Board Computer (OBC) with the simulation computer. The OBC is the board on which the control software runs.

Figure 4:
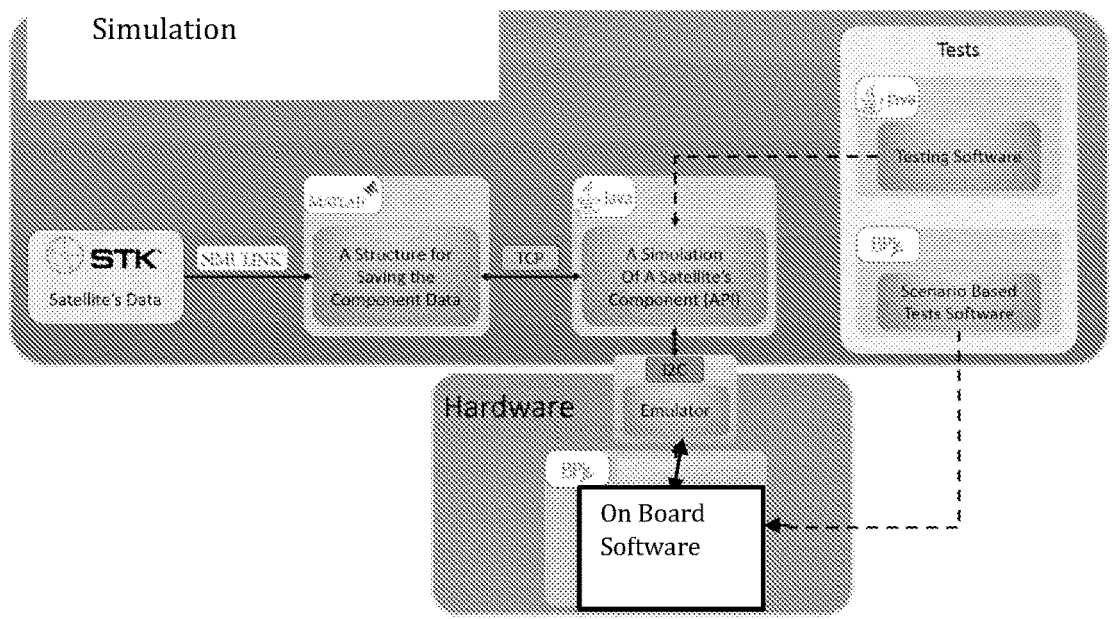
FIG. 4 is a flow chart of the proposed method.

FIG. 4 is a flow chart of the proposed method. The STK sends the physical information of the satellite to the MATLAB via the Simulink program. This information is stored in structures within the MATLAB, sent via TCP protocol to structures in Java and stored there, as well. These Java structures also contain functions for communication with each subsystem physical board of the satellite (APIs). An emulator (written in C) translates the code in Java into I2C protocol (a serial protocol for two-wire interface to connect low-speed devices like microcontrollers, EEPROMs, A/D and D/A converters, I/O interfaces and other similar peripherals in embedded systems) that the OBC can work with. The software within the OBC is written with the BPjs platform and contains the logic that controls each subsystem of the satellite. There are also two test programs—one was written in Java for Unit Tests to check the functionality of the APIs. The other is the verification program that was written with the BPjs verification tool to check the logic that was written to the OBC.

Figure 5:
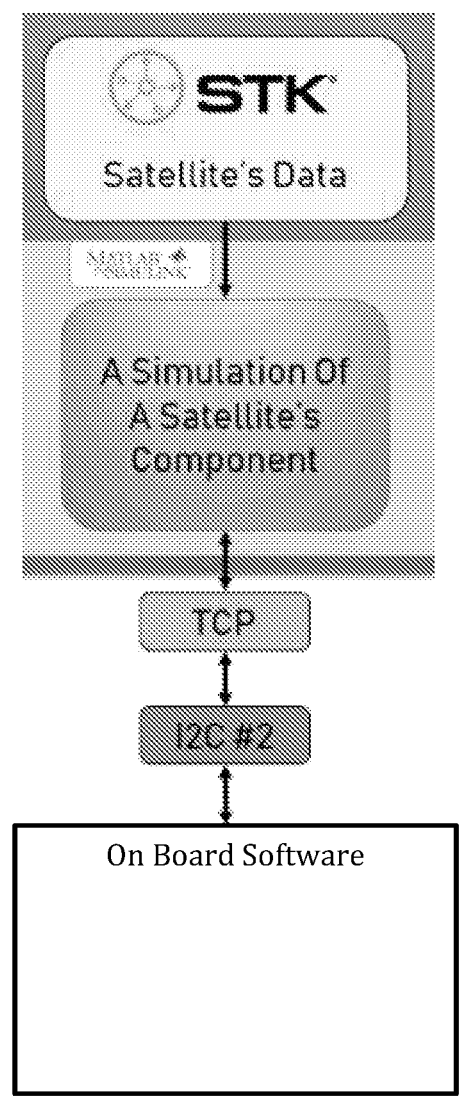
FIG. 5 is an illustration of a simulated satellite component (or subsystem) with a TCP connection between the I2C and the simulated satellite's component.

In addition to the software components, the BPjs platform has been used to simulate the sensors (temperature gauges, solar sensors, magnetometers, etc.), the actuators (magneto-tors, wheels, heaters, etc.) and the other satellite hardware that the OBC interfaces with (the energy management system, the solar panels, the communications system, etc.). Specifically, the main four subsystems of the satellite (EPS, ADCS, TRX, and the Thermal control) and their control logic in JavaScript that fulfills the principles of behavioral programming were implemented in Java. The main simulated four subsystems of the satellite written in Java communicate with the MATLAB software via a simple TCP protocol or via I2C protocol for receiving and controlling the current data of the satellite. FIG. 5 is an illustration of a simulated satellite component (or subsystem) with a TCP connection between the I2C and the simulated satellite's component.

Figure 6:
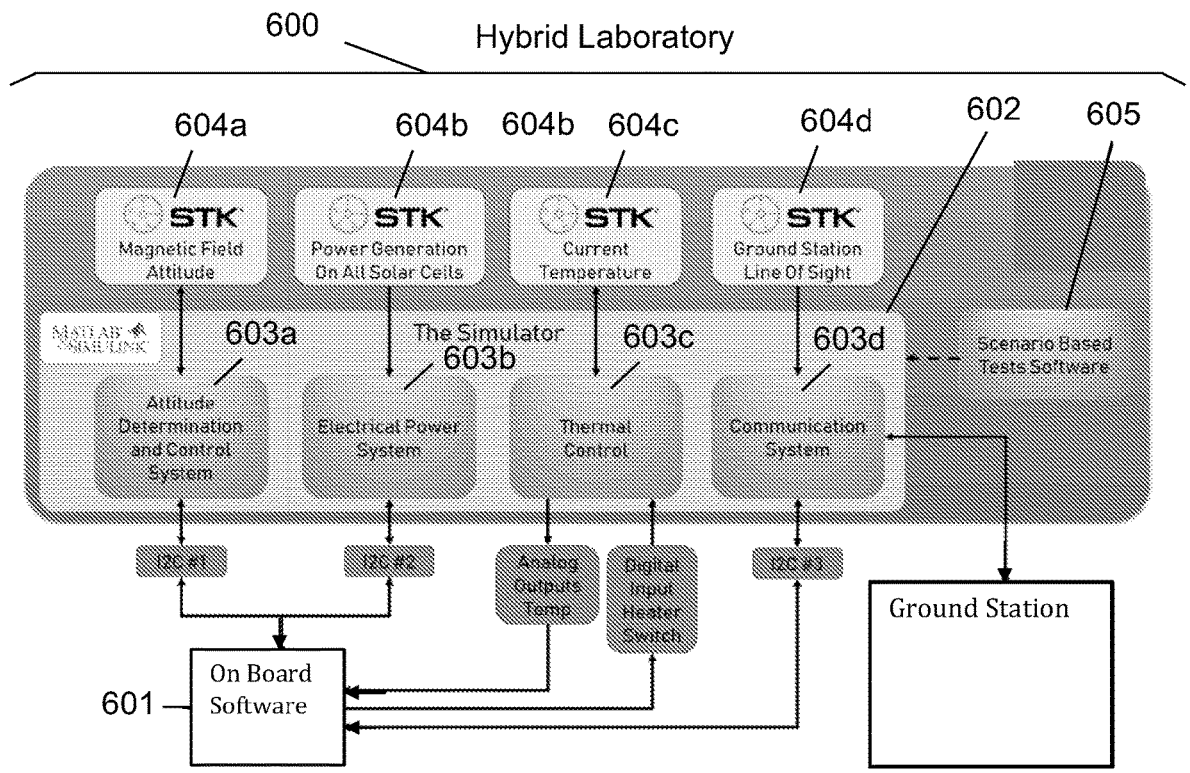
FIG. 6 illustrates a software testing environment using simulation and generating possible scenarios using Behavioral Programming (BP), according to an embodiment of the invention.

FIG. 6 illustrates a software testing environment using simulation and generating possible scenarios using Behavioral Programming (BP), according to an embodiment of the invention. A test setup (called 'Hybrid Laboratory' or testbed) for developing and for testing on-board satellite software was built. The test setup consists of the satellite board with its operating software, and (in this example) four data acquisition boards (DAQs) which emulate four sub-systems:
- an altitude determination and control sub-system;
- an electrical power system;
- a thermal control system;
- a communication system.

Using the I2C protocol, the DAQs connect the satellite board with a simulation computer that uses STK and MATLAB to simulate the satellite's environment dynamics and its internal sub-systems. The simulation and testing environment comprises an On-Board Computer (OBC) which contains the on-board software that is connected with an I2C protocol connection to any of the simulated satellite's subsystems. The OBC is completely isolated and therefore, senses the environment as it is in space.

The OBC software 601 is the operating software of the satellite main computer, which communicates with different sub-systems (modules) of the satellite using electronic signals. Generally, each sub-system has an interfacing card that translate the signals into a computer readable format.

The test setup 600 consists of a simulator 602 that comprises several modules 603a-603d which simulate actual subsystems of the satellite. Each module of 603a, . . . , 603d uses an STK unit of 604a, . . . , 604d in order to simulate the environmental conditions to which each module is currently exposed. For example, an STK can determine whether or not the satellite is currently subject to solar radiation or in darkness.

According to the invention, the test setup 600 also comprises an scenario based test software module 605, which generates a plurality of independent scenarios, each of which is written as a software component in the form of sequential thread of execution (called b-thread), using the Behavioral Programming (BP) paradigm. The BP paradigm takes all the independent scenarios (b-threads) and interleaves them to thereby create a much larger number of dependent and derived scenarios, which represent only possible combinations (out of huge amount of theoretical combinations) which are relevant to the operating conditions and states of the satellite. While it can be straightforward to consider all theoretical combinations (which may be random/combinatorial), the BP paradigm considers rules which determine at any given moment, combinations of scenarios (events) that can happen, as well as combinations of scenarios that cannot happen, according to the system requirements. For example, if there is an indication (from the STK) that the solar cells are exposed to the sun, they cannot be in the darkness. In this example, the simulator 602 creates a model that represents what can happen in the satellite and the conditions of the satellite and the environment.

By defining at any given moment which scenarios can happen after which scenarios and which scenarios cannot, and by using the Behavioral Programming (BP) paradigm for creating the b-threads, the test setup 600 dramatically enriches the amount of relevant test scenarios, far beyond the number of written b-threads. This large number of additional test scenarios is created automatically by the BP paradigm, while eliminating (filtering out) all irrelevant or illegitimate combinations. This allows performing much more relevant and legitimate test that were not considered by the developers who created the b-threads and therefore, identifying much more coding errors (bugs) in the tested software.

There are two ways in which the on-board software can receive data from the four satellite's subsystems—one is via the I2C protocol (shown at FIG. 6) and the other via the TCP protocol (shown later on in FIG. 7). The ability to communicate using the TCP protocol was added in order to simplify the system development and to test it without the need of connecting physical components to the system.

Figure 7:
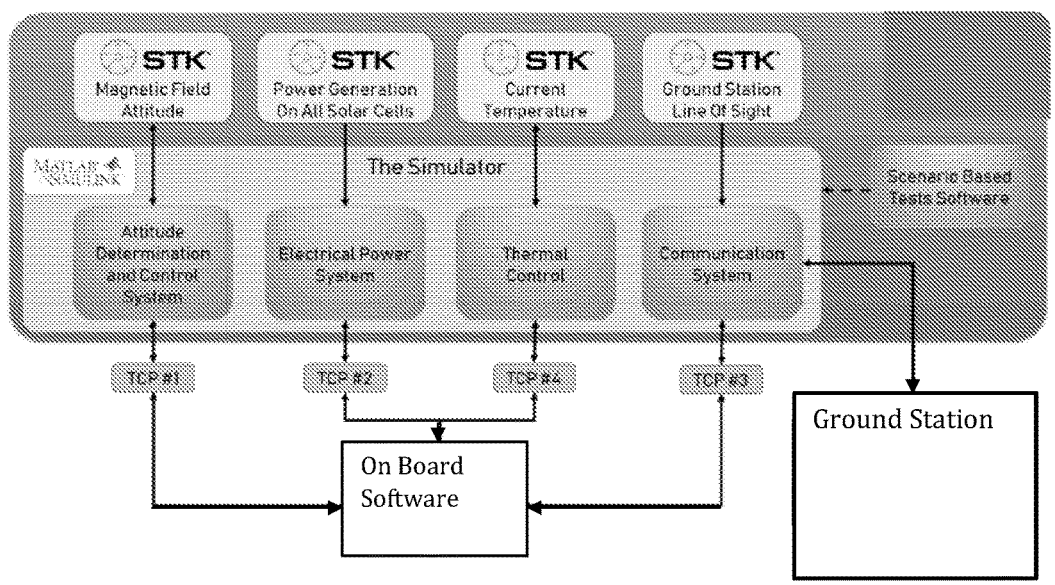
FIG. 7 illustrates a software testing environment using simulation and generating possible scenarios using Behavioral Programming (BP), where the simulation computer is connected via TCP protocol to each of the simulated satellite's subsystems.

FIG. 7 illustrates a software testing environment using simulation and generating possible scenarios using Behavioral Programming (BP), where the simulation computer is connected via TCP protocol to each of the simulated satellite's subsystems. This structure allows for easily development and testing of the flight software without the need of connecting physical components to the system.

The flight software provided by the present invention was written for a nano-satellite categorized as CubeSat, which from now on is referred as a satellite, since it is possible to apply this software to larger satellites.

As shown in FIGS. 5 and 6, the On-Board Computer (OBC) [39], is the 'brain' of the satellite. The primary role of the OBC is to control all sub-systems of the satellite. The OBC collects information from different sub-systems of the satellite, analyzes the information and takes necessary and appropriate decisions when required. The OBC performs several different tasks:
1. Receiving and responding to commands from the ground station as well as handle the general housekeeping of the satellite.
2. Collecting the telemetry data, formatting and encoding the data for transmitting to the ground station.
3. Attitude determination and control by monitoring the earth's magnetic field using control algorithms.
4. Monitoring temperature of all subsystems and maintaining the satellite in a specified temperature range using heaters.
5. Storing payload and telemetry data during a non-visible period for transmission during visibility.

The OBC contains the on-board software, memory, and other hardware peripherals and is connected to the simulated computer. The Satellite Tool Kit (STK) is a physics-based software package from Analytical Graphics, Inc., that allows engineers and scientists to perform complex analyses of ground, sea, air, and space assets, and share results in one integrated solution (http://agi.com/products/satellite-design-and-operations). At the core of STK there is a geometry engine for determining the time-dynamic position and attitude of objects ('assets'), and the spatial relationships among the objects under consideration including their relationships or accesses given several complexes, simultaneous constraining conditions. This tool is known as a reliable tool in space simulations and thus we decided to use it. STK calculates the environment model of a satellite on its track (magnetic field, ground cover, gravitational model, etc.).

The dynamic model of the satellite, written in MATLAB, simulates some of the physical components, such as batteries and body dynamics (three-axis model, Euler equations). STK along with MATLAB were used to calculate continual telemetry for our satellite. For receiving this information from the STK to MATLAB, Simulink was used—a block diagram environment for multi-domain simulation and Model-Based Design (https://ch.mathworks.com/products/simulink.html). In order to communicate between the simulated hardware and the I2C, there was a need to add an additional TCP protocol layer for transferring the messages, as shown at FIG. 7. This layer was written in C language.

One of the advantages of the hybrid laboratory is the ability to simulate various test scenarios for the software that was described, for example, hardware failures, environmental impacts, and various routes. Another advantage is the ability to add real hardware in the future instead of the simulation components and test integration of the hardware components with the simulator, the satellite computer, and the on-board software.

The present invention provides three contributions to the field of on-board satellite software programming and testing:
1. Software. A novel approach for programming satellites software that allows for incremental development and an alignment with the requirements. The approach is based on the behavioral programming methodology and on the BPjs tool. Scenario-based programming was used, where software components (modules) represent different aspects of mission scenarios and anti-scenarios (sequences of events that must not happen).
2. Verification. A tool and methodology for verifying the correctness of the proposed on-board satellite software, by looking at all of its possible runs, and ensuring they all comply with a set of formal requirements. This verification can be performed on specific parts of a model, on specific logical layers of an application, or on an entire model at a specific abstraction level.
3. Testing. A novel hybrid laboratory for advanced simulation and testing of satellite mission software, where scenario-based programming is used to automatically generate complex test scenarios.

While the provided examples were simplified, the suggested approaches can be applied to full scale on-board satellite software.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] Damm, W. and Harel, D., "LSCs: Breathing life into message sequence charts," *Form. Methods Syst. Des.*, Vol. 19, No. 1, 2001, pp. 45-80, doi:10.1023/A: 1011227529550.
[2] Harel, D. and Marelly, R., *Come, Let's Play: Scenario-Based Programming Using LSCs and the Play-Engine*, Springer Science & Business Media, 2003.
[3] Harel, D., Marron, A., and Weiss, G., "Behavioral Programming," *Communications of the ACM*, Vol. 55, No. 7.
[4] Harel, D., Marron, A., and Weiss, G., "Programming coordinated behavior in Java," in D'Hondt, T., ed., "ECOOP—Object-Oriented Programming," Springer Berlin Heidelberg, 2010.
[5] Shimony, B. and Nikolaidis, I., "On coordination tools in the PicOS tuples system," in "ICSE,", 2011, pp. 19-24.
[6] Wiener, G., Weiss, G., and Marron, A., "Coordinating and Visualizing Independent Behaviors in Erlang," in "Proceeding 9th ACM SIGPLAN Work. Erlang," ACM, 2010, pp. 13-22.
[7] Bar-Sinai, M., Weiss, G., and Shmuel, R., "BPjs: An Extensible, Open Infrastructure for Behavioral Programming Research," in "Proceedings of the 21st ACM/IEEE International Conference on Model Driven Engineering Languages and Systems: Companion Proceedings," ACM, New York, N.Y., USA, MODELS '18, 2018, pp. 59-60, doi:10.1145/3270112.3270126.
[8] Marron, A., Weiss, G., and Wiener, G., "A decentralized approach for programming interactive applications with javascript and blockly," in "Proceedings of the 2nd edition on Programming systems, languages and applications based on actors, agents, and decentralized control abstractions," ACM, 2012, pp. 59-70.
[9] Kugler, H., Plock, C., and Roberts, A., "Synthesizing biological theories," in "CAV,", 2011, pp. 579-584.
[10] Maoz, S., "Polymorphic scenario-based specification models: Semantics and applications," in "International Conference on Model Driven Engineering Languages and Systems," Springer, 2009, pp. 499-513.
[11] Greenyer, J., Gritzner, D., Gutjahr, T., Konig, F., Glade, N., Marron, A., and Katz, G., "ScenarioTools—A tool suite for the scenario-based modeling and analysis of reactive systems," *Science of Computer Programming*, Vol. 149, 2017, pp. 15-27.
[12] Harel, D., Kugler, H., Marelly, R., and Pnueli, A., "Smart play-out of behavioral requirements," in "FMCAD," Springer, Vol. 2, 2002, pp. 378-398.
[13] Harel, D., Lampert, R., Marron, A., and Weiss, G., "Model-checking Behavioral Programs," in "Proceedings of the Ninth ACM International Conference on Embedded Software," ACM, New York, N.Y., USA, EMSOFT '11, 2011, pp. 279-288, doi:10.1145/2038642.2038686.
[14] Harel, D., Kantor, A., Katz, G., Marron, A., Mizrahi, L., and Weiss, G., "On composing and proving the correctness of reactive behavior," in "EMSOFT,", 2013, pp. 1-10.
[15] Maoz, S. and Sa'ar, Y., "Counter play-out: executing unrealizable scenario-based specifications," in "ICSE,", 2013, pp. 242-251.
[16] Katz, G., "On module-based abstraction and repair of behavioral programs," in "Log. Program. Artif. Intell. Reason.", ACM, pp. 518-535, 2013.
[17] Harel, D., Katz, G., Marron, A., and Weiss, G., "Non-intrusive Repair of Safety and Liveness Violations in Reactive Programs," *Transactions on Computational Collective Intelligence XVI*, pp. 1-33.
[18] Harel, D., Kantor, A., and Katz, G., "Relaxing Synchronization Constraints in Behavioral Programs," in "Logic for Programming Artificial Intelligence and Reasoning,", 2013, pp. 355-372.
[19] Ran, D., Sheng, T., Cao, L., Chen, X., and Zhao, Y., "Attitude control system design and on-orbit performance analysis of nano-satelliteTian Tuo 1," *Chinese Journal of Aeronautics*, Vol. 27, No. 3, 2014, pp. 593-601.
[20] Deng, S., Meng, T., Wang, H., Du, C., and Jin, Z., "Flexible attitude control design and on-orbit performance of the ZDPS-2 satellite," *Acta Astronautica*, Vol. 130, 2017, pp. 147-161.
[21] *Appendices for A Scenario Based On-board Software and Testing Environment for Satellites*. 59 IACAS, 2019. https://github.com/bThink-BGU/59IACAS-Appendix.

The invention claimed is:
1. A method for testing operating software of a system consisting of a plurality of internal subsystems operating in an environment, comprising:
   a) providing a hardware board that controls said system by an operating software and said internal subsystems by electronic signals;
   b) translating said signals into a computer readable format by an interfacing card for each internal subsystem;
   c) simulating said internal subsystems by data acquisition modules by a simulating computer;
   d) simulating, by said simulating computer, the environmental conditions to which each module is currently exposed;

e) generating, by a scenario based test software module, a plurality of possible independent test scenarios using Behavioral Programming (BP); and f) interleaving said independent scenarios at run time by an execution engine, to thereby automatically create a larger number of dependent and derived scenarios representing only possible combinations which are relevant to the operating conditions and states of said system.

2. A method according to claim 1, wherein possible combinations which are relevant to the operating conditions and states of said system are selected by rules which determine at any given moment, combinations of scenarios that that can happen and combinations of scenarios that cannot happen, according to the system requirements.

3. A method according to claim 1, wherein the environmental conditions to which each module is currently exposed are simulated using Systems Tool Kit (STK) and MATLAB, for running an environment model.

4. A method according to claim 1, wherein independent scenarios are created by atomic behaviors that may, must, or must not happen, where each behavior is a b-thread being a sequential thread of execution.

5. A method according to claim 1, wherein the system is a satellite and the operating software is a satellite software.

6. A test setup for testing operating software of a system consisting of a plurality of internal subsystems operating in an environment, comprising:
   a) a hardware board that controls said system by an operating software and said internal subsystems by electronic signals;
   b) an interfacing card for each internal subsystem for translating said signals into a computer readable format;
   c) a simulating computer, adapted to:
      c.1) simulate said internal subsystems by data acquisition modules;
      c.2) simulate the environmental conditions to which each module is currently exposed;
      c.3) generate, by a scenario based test software module, a plurality of possible independent test scenarios using Behavioral Programming (BP); and
      c.4) interleave said independent scenarios at run time by an execution engine, to automatically create a larger number of dependent and derived scenarios representing only possible combinations which are relevant to the operating conditions and states of said system.

7. A test setup according to claim 6, in which possible combinations which are relevant to the operating conditions and states of said system are selected by rules which determine at any given moment, combinations of scenarios that that can happen and combinations of scenarios that cannot happen, according to the system requirements.

8. A test setup according to claim 6, in which the environmental conditions to which each module is currently exposed are simulated using Systems Tool Kit (STK) and MATLAB, for running an environment model.

9. A test setup according to claim 6, in which independent scenarios are created by atomic behaviors that may, must, or must not happen, where each behavior is a b-thread being a sequential thread of execution.

10. A test setup according to claim 6, in which the system is a satellite and the operating software is a satellite software.

* * * * *